US005245114A

United States Patent [19]

Forrester

[11] Patent Number: 5,245,114

[45] Date of Patent: Sep. 14, 1993

[54] IMMOBILIZATION OF LEAD IN BOTTOM ASH

[75] Inventor: Keith E. Forrester, Stratham, N.H.

[73] Assignee: Wheelabrator Environmental Systems, Inc., Hampton, N.H.

[21] Appl. No.: 702,787

[22] Filed: May 21, 1991

[51] Int. Cl.[5] ........................ C04B 18/04; A62D 3/00

[52] U.S. Cl. .................................... 588/236; 423/659; 106/405; 106/DIG. 1; 110/259

[58] Field of Search ................. 423/659, DIG. 20, 98; 106/405, DIG. 1; 588/236; 110/259

[56] References Cited

U.S. PATENT DOCUMENTS

| | | | |
|---|---|---|---|
| 3,676,165 | 7/1972 | Schneider-Arnold | 106/117 |
| 4,049,462 | 9/1977 | Cocozza | 106/85 |
| 4,113,504 | 9/1978 | Chen et al. | 106/97 |
| 4,124,405 | 11/1978 | Quienot | 106/111 |
| 4,354,876 | 10/1982 | Webster | 106/85 |
| 4,375,986 | 3/1983 | Pichat | 106/85 |
| 4,377,483 | 3/1983 | Yamashita et al. | 210/670 |
| 4,384,923 | 5/1983 | Hillekamp | 201/15 |
| 4,432,666 | 2/1984 | Frey et al. | 405/129 |
| 4,496,267 | 1/1985 | Gnaedinger | 106/118 |
| 4,671,882 | 6/1987 | Douglas et al. | 210/720 |
| 4,737,356 | 4/1988 | O'Hara et al. | 423/659 |
| 4,853,208 | 8/1989 | Reimers et al. | 423/659 |
| 4,950,409 | 8/1990 | Stanforth | 210/751 |
| 4,975,115 | 12/1990 | Irons | 75/330 |

*Primary Examiner*—Gary P. Straub
*Assistant Examiner*—Timothy C. Vanoy
*Attorney, Agent, or Firm*—Banner, Birch, McKie & Beckett

[57] ABSTRACT

Bottom ash arising from solid waste combustion has lead (Pb) sufficient quantity to sometimes fail the EPA TCLP test. Addition of water-soluble phosphate, especially phosphoric acid, increases the immobilization of lead (Pb) so as to make such residues in compliance with the toxicity tests over a substantially broader pH range, particularly with respect to the more stringent TCLP extraction test. The bottom ash may be wet or dry when contracted with the water-soluble phosphate. The contacting is preferably preformed in an enclosed environment to avoid bottom ash contact with or exposure to the ambient atmospheres prior to treatment.

13 Claims, 2 Drawing Sheets

IMMOBILIZATION OF LEAD IN BOTTOM ASH

FIELD OF THE INVENTION

This invention relates to a method for immobilizing lead in solid residues, and more particularly immobilizing lead contained in bottom ash from the incineration or combustion of solid wastes.

BACKGROUND OF THE INVENTION

An increasing world population leads to a continually increasing amount of refuse. Additionally, a increased level of civilization appears to generate an increased amount of refuse on a per capita basis. Both factors in combination lead to mounting pressure to devise methods of waste disposal which are economically, energetically, and environmentally sound.

In recent years, especially in urban areas, the increased demand for usable land and other concerns has caused one to turn from a landfill as the major mode of refuse disposal to other options, especially the use of raw refuse as an energy source. One variant of the latter is the mass burning approach, where all the refuse in its raw state is burned without any preliminary treatment such as separating the noncombustible from the combustible material. Quite briefly, in this method solid wastes, for example, raw garbage, are dumped into storage where it is homogenized and dried to some degree. Refuse from the storage area is fed into a combustion zone where the heated gases often are used to generate steam. Flue gases then pass from the combustion zone to a separation zone, often an electrostatic precipitator, where dust and ash are removed. The ash so removed from the flue gas, called fly ash, is then mixed with the ash collected in the combustion zone, called bottom ash, and the combined ash used for landfill.

In certain states which regulate ash under RCRA, ash is currently either managed as a solid or a hazardous waste depending on the lead (Pb) and cadmium (Cd) leachability as revealed by the Toxicity Characteristics Leaching Procedure (TCLP) extraction test defined by the Resource Conservation and Recovery Act (RCRA). The TCLP extraction test predicts the effect of decomposing organic material in a landfill on wastes being considered for landfill waste disposal. When organic material decomposes, acetic acid is formed. Thus, in the TCLP extraction test, both water and acetic acid are used to extract leachable heavy metals, such as lead and cadmium from the waste, which are then quantified.

It is well known that some of the more volatile compounds of certain metals tend to accumulate in the fly ash. Especially where the latter is to be used as landfill with decomposing solid wastes, leaching of toxic metals, especially cadmium and lead, constitutes a potential hazard to the ecosystem, for example, both surface water supplies and aquifers. As such, fly ash often fails the TCLP regulatory limit of 5.0 mg/l for lead and 1.0 mg/l for cadmium. I have found that bottom ash contains little or no leachable cadmium because cadmium with a low vaporization temperature (about 600° F.) is efficiently volatilized from bottom ash at high grate temperatures (1600°-2500° F.). Bottom ash will occasionally fail the TCLP test in regards to leachable lead, due primarily to lead's higher vaporization temperature (1600° F.) in conjunction with the operating grate temperature at the time. If the TCLP test is failed, the fly and/or bottom ash may be handled as a hazardous waste depending on state regulations. Such a designation entails additional handling procedures and special disposal sites. Hazardous materials are always more expensive to manage than nonhazardous wastes.

One process for treating fly ash alone or in combination with bottom ash to immobilize leachable lead and cadmium therein is described in U.S. Pat. No. 4,737,356. The treatment involves contacting the dry ash with a source of water-soluble phosphate and with an alkaline source of calcium to immobilize the lead and cadmium in the ash. As noted earlier, bottom ash typically contains little leachable cadmium. Thus, the combining of the bottom ash with the fly ash artificially reduces the cadmium levels of the mixture. However, this results in greater quantities of combined ash requiring drying and treatment, thereby increasing equipment sizes and associated costs and handling requirements. Thus, the bottom ash is occasionally and preferably disposed of separately from fly ash.

Thus, there is a need for a method to safely dispose of bottom ash or to inexpensively render it safe for disposal or for use as an aggregate or building material without concern of leaching of lead.

It is noted that both untreated fly ash and bottom ash are often regarded as hazardous waste products in certain states which require TCLP. Thus, it is highly desirable to reduce the amount of lead leached from bottom ash containing leachable lead to an amount below the TCLP regulatory level specified by the EPA. It would also be desirable to have a process for treating bottom ash that could be retrofitted into existing treatment facilities without substantial capital expense or change in the operations of the process to allow for disposal as a solid waste or reuse. It would further be desirable to have a process for treating bottom ash without first having to dry it or to mechanically process it, i.e., provide a wet in situ treatment for bottom ash.

The invention herein is a solution to this problem. More specifically, it is a method of treating bottom ash and mixtures containing bottom ash, so as to reduce the amounts of lead leached therefrom to a level below the TCLP regulatory level specified by the EPA. Stated differently, the invention herein is a method of immobilizing, or insolubilizing, lead in bottom ash. The method is convenient, quite simple, very efficient, applicable over a wide pH range, and relatively low cost. An important advantage of the method of the present invention is that the bottom ash may be wet or dry. Another important advantage of the method of the present invention is that the method can be performed in a totally "enclosed" environment, thereby exempting the practice of the present invention in this manner from RCRA Part B permitting. The method is, therefore, commercially extraordinarily attractive as well as being environmentally beneficial.

SUMMARY OF THE INVENTION

Accordingly, the purpose of this invention is to increase the immobilization of lead in bottom ash. In one embodiment, lead-containing residue in the form of bottom ash either alone or in combination with other lead-containing wastes is treated with an effective amount of a source of water-soluble phosphate to insolubilize leachable, soluble lead species to below regulatory limits. In a more specific embodiment, the water-soluble phosphate is added in an amount equivalent to from about 0.01% to about 15%, preferably from about 1 to about 15% and more preferably from about 1 to about 5%, by weight of phosphoric acid based on the total residue. In an alternate embodiment, the water-soluble phosphate is added in an amount equivalent to from about 0.01% to less than 1%, preferably from about 0.1% to less than 1%, by weight of phosphoric acid based on the total residue. The residue may be treated by a wet or dry application of the phosphates thereto in order to convert the soluble lead species into insoluble phosphate-lead compounds that would not leach significantly under the EPTOX/TCLP test procedures. If a dry application of the phosphates is used, the soluble lead species in the treated residue would be rendered insoluble in situ, i.e., in the landfill, by water, e.g., rain water, percolating through the landfill, solubilizing the phosphate and thereby insolubilizing the soluble lead species thereof. The application of the water-soluble phosphate may be at any convenient point after solid residue production preferably prior to exiting the solid waste combustion process, for example, the application of the phosphates into the bottom ash quench bath right below the furnace or into existing pneumatic and/or screw conveyors which convey the bottom ash in a connected and preferably in an enclosed fashion from the solid waste combustion equipment.

DETAILED DESCRIPTION

The materials being treated in the present invention are lead-containing residues, preferably bottom ash produced by solid waste combustion processes. Such residues contain lead which can be leached at levels in excess of 5 ppm (5 mg/l), as determined by an EPA test, particularly the more stringent TCLP extraction test. When dry, the initial physical character of such solids is a free flowing particulate mass, and a virtue of the present invention is that after treatment to immobilize lead the solid residues retain their initial physical character, even after water percolation, which is important in the handling thereof, i.e., no need to change handling equipment in part because the weight or density of the solid residue has not been significantly increased. In one variant of the present invention, the residue treated is a mixture of bottom ash with another lead-containing solid residue usually containing up to about 25% by weight of bottom ash, preferably between 2 and about 25% bottom ash and more preferably between 5 and 20% bottom ash. The following description of the present invention is couched in terms of bottom ash only. This corresponds to a convenient way of carrying out the present invention, but the choice of this particular description is for expository convenience only. It is to be clearly understood that variants such as treatment of a mixture of bottom ash with other solid residues or independently treating bottom ash and then combining it with another inert solid residue are intended to be subsumed under the present invention as claimed, as are other premutations which one skilled in the art will recognize.

Figure 1:
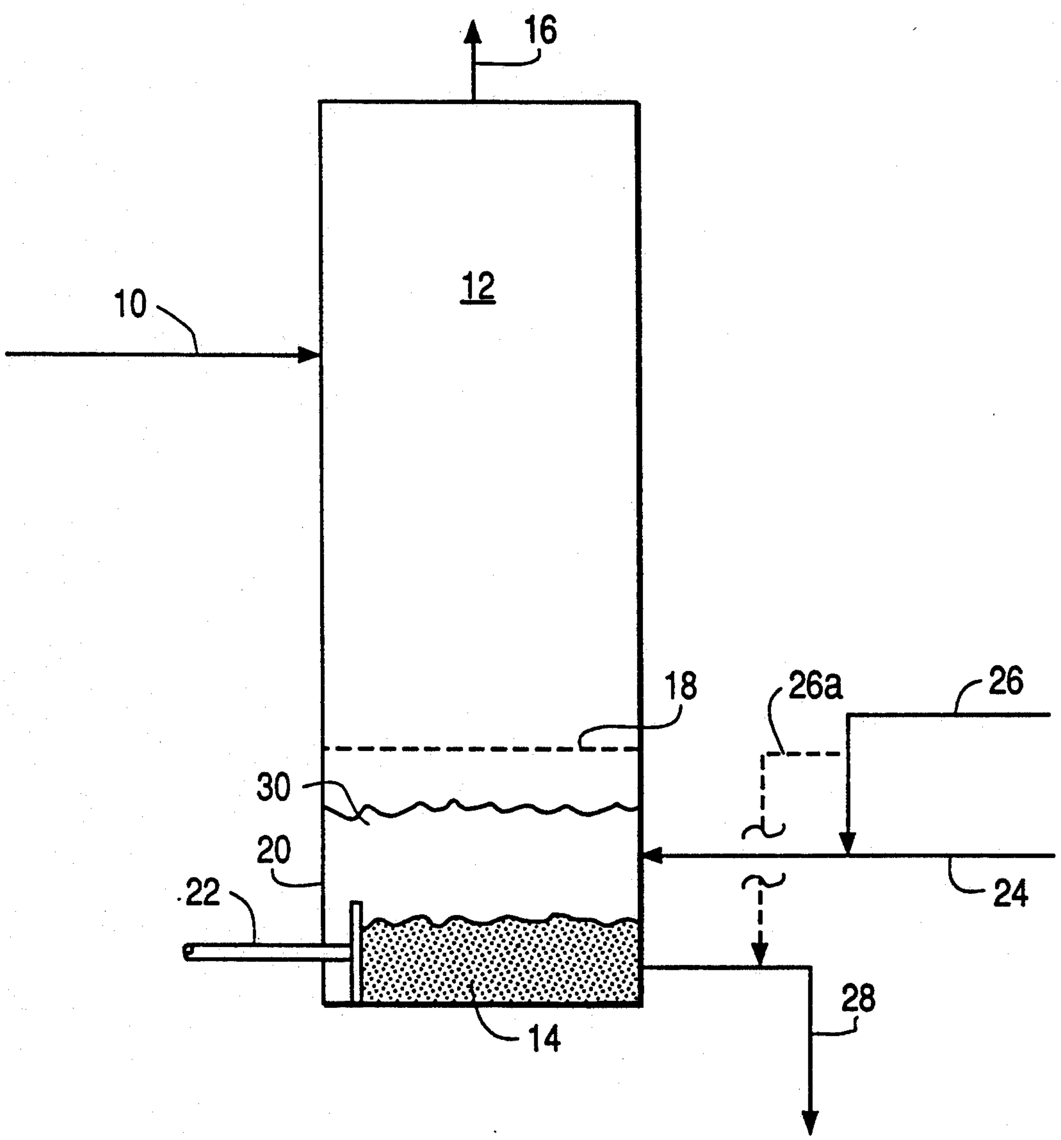
FIG. 1 shows an embodiment of the present invention in process schematic fashion showing an incinerator which allows the application of the water-soluble phosphates therein to bottom ash in a connected and enclosed fashion.

Incinerators for burning trash and other solid wastes are well known to those skilled in the art. Referring now to FIG. 1, trash and other solid wastes 10 are fed to an incinerator 12 and burned for a sufficient time to produce bottom ash stream 28 and fly ash stream 16 from solid wastes 10. Fly ash 16 is carried out the top of incinerator 12 and processed separately from bottom ash 14. The bottom ash 14 includes grate ash, clinkers, riddlings and superheater fly ash knockdown. The bottom ash 14 falls within the incinerator 12 through a grate 18 into a quench tank 20 at the bottom of the incinerator 12. The quench tank 20 is filled with water 30 to create a water seal at the bottom of the incinerator 12 which covers the bottom ash exit way. Expeller means 22 for discharging the bottom ash 14 from the quench tank 20 are provided. The expeller means 20 may be a ram discharger, a drag conveyor or the like. Due to water losses by evaporation or take-up by the bottom ash 14, a water-makeup 24 is provided. Preferably, the water-soluble phosphate 26 necessary to treat the bottom ash 14 is metered into the quench tank 20 via the water makeup 24. Alternatively, the water-soluble phosphate 26 (via dashed line 26a) may be mixed with the bottom ash stream 28 before or after the bottom ash 14 is dried by, for example, spraying the water-soluble phosphate 26 thereon in either a wet or dry form and then agitating the mixture to ensure the dispersion of the phosphate therethrough.

Any convenient source of water-soluble phosphate may be used in the practice of this invention. The bottom ash may be treated by a wet or dry application of the phosphate thereto. If a dry application of the phosphates is used, the soluble lead species in the treated bottom ash would be rendered insoluble in situ, i.e., in the landfill, by water, e.g., rain water, percolating through the landfill, solubilizing the phosphate and thereby insolubilizing the soluble lead species thereof. Wet or dry application can be accomplished by any convenient means, for example, pneumatic injection (dry application) and spraying (wet application). By a water-soluble phosphate it is meant a phosphate soluble in water at about 20° C. at least to the extent of about 5 weight-volume percent. Phosphoric acids including orthophosphoric acid, hypophosphoric acid, metaphosphoric acid and pyrophosphoric acid, can be conveniently used in this invention. Sometimes it is desirable to use a less acidic source of phosphate. Other less acidic sources of phosphates include: phosphate, monohydrogen phosphate, and dihydrogen phosphate salts, such as trisodium phosphate, disodium hydrogen phosphate, sodium dihydrogen phosphate, potassium phosphate, dipotassium hydrogen phosphate, potassium dihydrogen phosphate, lithium phosphate, lithium hydrogen phosphate and lithium dihydrogen phosphate. Quite generally, the salts of the various phosphoric acids may be utilized, and among these the alkali metal salts are most frequently employed.

The amount of water-soluble phosphates source to be added to the bottom ash or other solid residues combined with bottom ash to ensure adequate immobilization of lead will depend on such variables as the alkalinity of the bottom ash and/or any other solid residue that may be present, its buffering capability, the amount of lead initially present, and so on. An amount of the water-soluble phosphate source equivalent to between about 5% and about 15% by weight of phosphoric acid, $H_3PO_4$, based on a total solid residue is sufficient. It is believed that an amount of the water-soluble phosphate source equivalent to between about 0.01% and about 5% by weight of phosphoric acid, $H_3PO_4$, based on a total solid waste should be sufficient, preferably from 0.1% to less than 1% by weight. However, the foregoing is not intended to preclude yet higher usage of a water-soluble phosphate if needed since amounts greater than 5% by weight will also work, but are more costly.

Figure 2:
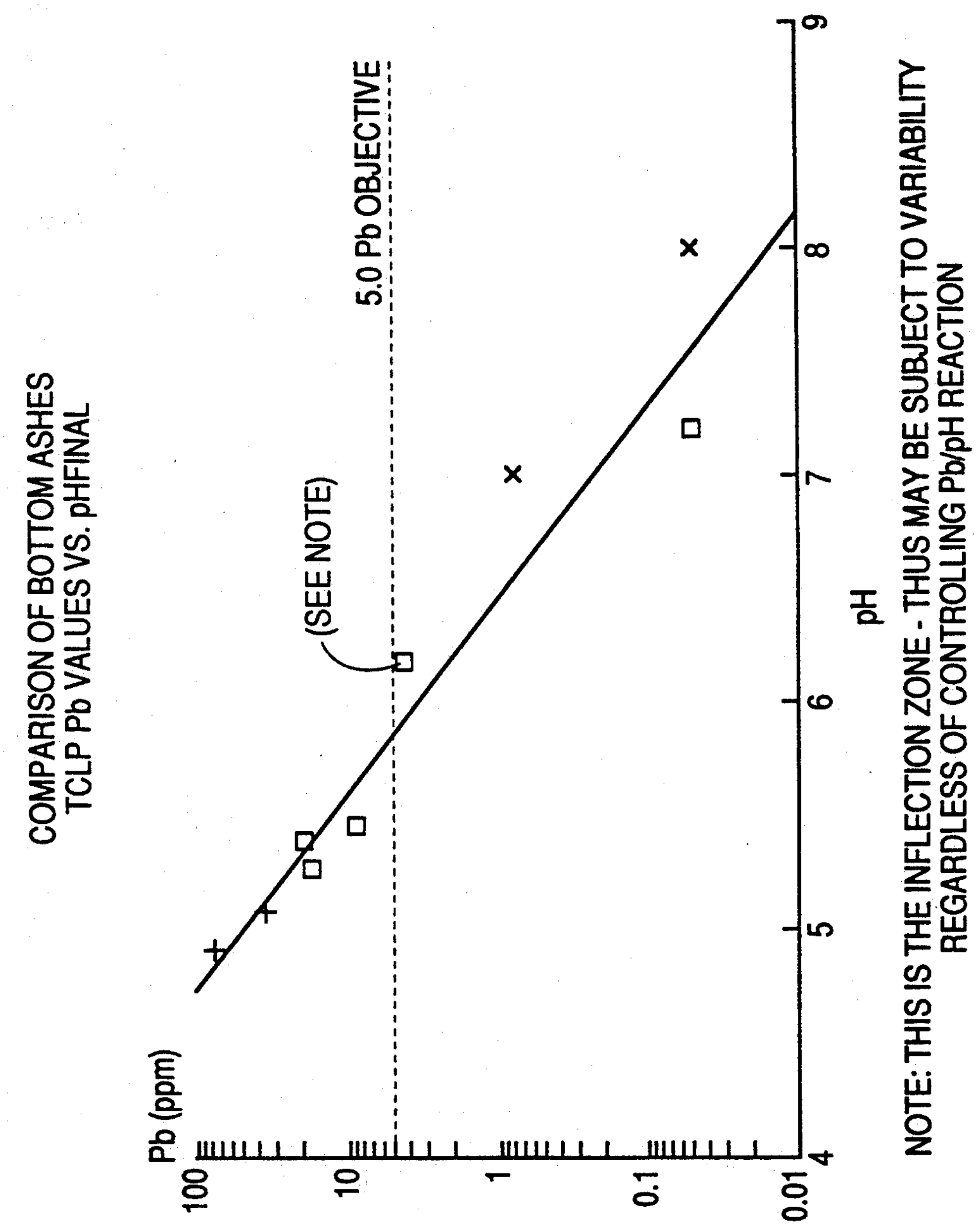
FIG. 2 is a graphical presentation of TLCP lead values of various sized unimmobilized bottom ash to final extraction pH values of the corresponding TCLP extracts.

It has been found that the unimmobilized bottom ash leaching rate of lead (Pb) under TCLP is extremely sensitive to residual alkalinity in the bottom ash, particularly when using Extraction Fluid No. 1. This is shown in FIG. 2 which presents TCLP lead values of various sized unimmobilized bottom ash from various solid waste incinerators to final extraction pH values of those TCLP extracts. The relationship observed is quite impressive as it follows the classical lead (Pb) solubility curve for lead (Pb) from surface active sources.

Given that this unimmobilized bottom ash residual alkalinity has been observed to vary randomly and that the lead solubility reaction is highly sensitive to this change, the method of the present invention ensures compliance with the TCLP test and thereby serves a product quality control objective. Otherwise, it is highly likely that individual or composite bottom ash samples which have not been immobilized would swing from lead values of less than 0.05 ppm at pH values of about 8.0 to lead values of 17.0 ppm at pH values of about 5.28, which is much greater than the 5.0 ppm regulatory limit for lead. Thus, by using the method of the present invention, bottom ash lead fluctuations would be consistently reduced to below the regulatory limit by reducing the lead concentration to a level which is less sensitive to the TCLP final pH fluctuations.

The examples below are merely illustrative of this invention and are not intended to limit it thereby in any way.

EXAMPLE

In this example, bottom ash from an incinerator in Baltimore, Md. was treated with phosphoric acid. For this pilot study, the incinerator was modified to include a metering system for the 75% concentrate green phosphoric acid. The $PO_4^{3-}$ feed rate was about 5 mg/g of bottom ash discharged. The $H_3PO_4$ was injected into the bottom ash quench water via a sparging tube held through a view port with a vertical drop into the water column above the bottom ash-water interface within the ram discharger.

The samples of treated bottom ash were then extracted according to TCLP procedure set forth in *Federal Register*, Vol. 55, No. 61 (Mar. 29, 1990) which corresponds in pertinent part to the procedure set forth in *Federal Register*, Vol. 55, No. 126, pp. 26985-26998 (Jun. 29, 1990), both of which are hereby incorporated by reference. This test procedure is also referenced in EPA SW 846, 3rd Edition. The retained leachate was digested prior to analysis by atomic absorption spectrophotometry.

Five unimmobilized samples (Samples 1-5) of bottom ash were obtained on five separate days. Four immobilized samples (Samples 6-9) of bottom ash were obtained on four subsequent days. Each sample was tested using the TCLP test procedure, the EPTOX test procedure (as described in U.S. Pat. No. 4,975,115 and 4,737,356, which are hereby incorporated by reference) and total lead.

In regard to the TCLP test, each sample was tested to see what extraction fluid should be selected for the TCLP test procedure. For each sample, a 5 gram portion of the sample was stirred with 96.5 milliliters of deionized water. The pH at the end of five minutes was then recorded. If the pH was greater than 5, then 3.5 milliliters 1.0N HCl was added and the mixture was then heated to 50° C. for five minutes. Upon cooling, the pH was then recorded and used as a basis for extraction fluid selection. The pHs for each of the samples are noted in Table 1.

TABLE 1

| Sample | | Extraction Fluid Selection, pH |
|---|---|---|
| Unimmobilized: | | |
| 1 | w/deionized $H_2O$ | 11.58 |
| | then adding HCl | 3.03 |
| 2 | w/deionized $H_2O$ | 11.63 |
| | then adding HCl | 2.88 |
| 3 | w/deionized $H_2O$ | 11.51 |
| | then adding HCl | 3.05 |
| 4 | w/deionized $H_2O$ | 11.10 |
| | then adding HCl | 2.32 |
| 5 | w/deionized $H_2O$ | 11.10 |
| | then adding HCl | 2.69 |
| Immobilized: | | |
| 6 | w/deionized $H_2O$ | 11.01 |
| | then adding HCl | 2.54 |
| 7 | w/deionized $H_2O$ | 10.86 |
| | then adding HCl | 2.29 |
| 8 | w/deionized $H_2O$ | 10.94 |
| | then adding HCl | 2.21 |
| 9 | w/deionized $H_2O$ | 11.85 |
| | then adding HCl | 3.07 |

On the basis of the foregoing, Extraction Fluid No. 1 was selected. Extraction Fluid No. 1 consists of 0.57% by volume glacial acetic acid to which 0.1N NaOH has been added to yield a pH of 4.93+/-0.05.

Since each of the samples contained no free liquid, the respective sample was not filtered before extraction. 100 grams of the respective sample was added to the extractor with 2000 milliliters of Extraction Fluid No. 1. The extraction time was twenty hours for untreated samples, and sixteen hours for treated samples. The final pH is recorded in Table 2. The extract was analyzed for lead and the amount detected also shown in Table 2 along with the regulatory limit for lead.

TABLE 2

| | | Lead (mg/l) | |
|---|---|---|---|
| Sample | Final pH | TCLP Value | Regulatory Limit |
| 1 | 7.01 | 0.8 | 5.0 |
| 2 | 6.99 | 0.98 | 5.0 |
| 3 | 6.77 | 0.38 | 5.0 |
| 4 | 5.92 | 0.74 | 5.0 |
| 5 | 6.11 | 0.43 | 5.0 |
| 6 | 6.55 | 0.16 | 5.0 |
| 7 | 6.51 | 0.21 | 5.0 |
| 8 | 6.40 | 0.09 | 5.0 |
| 9 | 6.15 | 0.1 | 5.0 |

Table 3 compares the results of the EPTOX test results and the TCLP text results for the same samples.

TABLE 3

| | | Lead (mg/l) | | | |
|---|---|---|---|---|---|
| Sample | Pass/ Fail | EPTOX | Regulatory Limit | TCLP | Total Lead (ug/g) |
| 1 | Fail | 15 | 5.0 | 0.8 | 440 |

TABLE 3-continued

| Sample | Pass/ Fail | Lead (mg/l) EPTOX | Regulatory Limit | TCLP | Total Lead (ug/g) |
|---|---|---|---|---|---|
| 2 | Fail | 10 | 5.0 | 0.98 | 2300 |
| 3 | Fail | 11 | 5.0 | 0.38 | 350 |
| 4 | Fail | 5.1 | 5.0 | 0.74 | 260 |
| 5 | Pass | 2.2 | 5.0 | 0.43 | 1200 |
| 6 | Pass | 0.86 | 5.0 | 0.16 | 550 |
| 7 | Pass | 4.2 | 5.0 | 0.21 | 510 |
| 8 | Pass | 0.85 | 5.0 | 0.09 | 270 |
| 9 | Pass | 0.44 | 5.0 | 0.10 | 480 |

The foregoing results in Tables 2 and 3 readily established the operability of the present process to immobilize leachable, soluble lead in the bottom ash generated by solid waste combustion processes. The leachable, soluble lead is maintained below the regulatory limit using either the TCLP test or EPTOX test procedures. It is believed that an amount of the water-soluble phosphate equivalent to less than 1% by weight of phosphoric acid should be effective to immobilize lead in bottom ash or other solubilizable lead-containing solid residues on down to about 0.1% by weight and, even down to about 0.01% by weight based on a total solid waste.

It will be apparent from the foregoing that many other variations and modifications may be made in the methods and the compositions herein before described, by those having experience in this technology, without departing from the concept of the present invention. Accordingly, it should be clearly understood that the methods and compositions referred to herein in the foregoing description are illustrative only and are not intended to have any limitation on the scope of the invention.

I claim:

1. A method of immobilizing lead in a free flowing particulate incinerator bottom ash which maintains its free flowing particulate nature after the immobilizing treatment, said method consisting essentially of:

contacting a feed stream consisting essentially of said bottom ash with an effective amount within the range from 0.01% to less than 1% by weight of the bottom ash of at least one water-soluble phosphate that is at least about 5 weight-volume percent soluble in water at about 20° C. to reduce the leaching of lead to a level no more than 5 ppm lead as determined in an EPA TCLP test performed on the resulting treated ash as set forth in the Federal Register, vol. 55, no. 126, pp. 26985–26998.

2. The method of claim 1, wherein the water-soluble phosphate is selected from the group consisting of phosphoric acid, polyphosphoric acid, hypophosphoric acid, metaphosphoric acid, and salts thereof.

3. The method of claim 2, wherein the salts are alkali metal salts.

4. The method of claim 3, wherein the salt is a trisodium phosphate, disodium hydrogen phosphate, sodium dihydrogen phosphate, tripotassium phosphate, dipotassium hydrogen phosphate, potassium dihydrogen phosphate, trilithium phosphate, dilithium hydrogen phosphate, lithium dihydrogen phosphate or mixtures thereof.

5. The method of claim 2, wherein the water-soluble phosphate is phosphoric acid.

6. The method of claim 1, wherein the solid residue is contacted with at least one water-soluble phosphate in an amount equivalent to about 0.1 to less than 1% by weight of phosphoric acid based on the total residue.

7. The method of claim 1, wherein said contacting is performed in an enclosed environment.

8. The method of claim 1, wherein said solid residue is wet when said contacting is performed.

9. The method of claim 1, wherein said solid residue is dry when said contacting is performed.

10. The method of claim 7 wherein the contacting step comprises:

contacting said bottom ash with said at least one water soluble phosphate in an enclosed conveyor.

11. The method of claim 10 wherein the contacting step occurs in an enclosed screw conveyor.

12. The method of claim 8 wherein the contacting step comprises:

contacting said bottom ash with said at least one water soluble phosphate in a bottom ash quench bath below a furnace producing said bottom ash.

13. The method of claim 1 wherein said bottom ash is produced by the combustion of trash and other solid wastes.

* * * * *